United States Patent [19]
Werner et al.

[11] Patent Number: 4,832,405
[45] Date of Patent: May 23, 1989

[54] HINGE JOINT FOR SEATS OF MOTOR VEHICLES AND THE LIKE

[75] Inventors: Heinz Werner, Remscheid-Hasten; Bernd Klüting, Radevormwald, both of Fed. Rep. of Germany

[73] Assignee: Keiper Recaro GmbH & Co., Remscheid, Fed. Rep. of Germany

[21] Appl. No.: 157,466

[22] Filed: Feb. 17, 1988

[30] Foreign Application Priority Data

Feb. 18, 1987 [DE] Fed. Rep. of Germany ....... 3705116

[51] Int. Cl.$^4$ .............................................. B60N 1/02
[52] U.S. Cl. .................................... 297/362; 297/355; 297/361
[58] Field of Search ............... 297/362, 361, 354, 355; 74/804, 805

[56] References Cited

U.S. PATENT DOCUMENTS

| | | | |
|---|---|---|---|
| 4,371,207 | 2/1983 | Wilking et al. | 297/348 |
| 4,453,767 | 6/1984 | Walk et al. | 297/362 |
| 4,504,091 | 3/1985 | Ohshiro | 297/362 |
| 4,538,855 | 9/1985 | Peetz et al. | 297/362 |
| 4,563,039 | 1/1986 | Jorg | 297/362 |
| 4,708,392 | 11/1987 | Werner et al. | 297/362 |
| 4,715,656 | 12/1987 | Walk et al. | 297/362 |

FOREIGN PATENT DOCUMENTS

| | | | |
|---|---|---|---|
| 2041302 | 2/1972 | Fed. Rep. of Germany | 297/362 |
| 2578601 | 9/1986 | France | 297/362 |

Primary Examiner—Kenneth J. Dorner
Assistant Examiner—Laurie K. Cranmer
Attorney, Agent, or Firm—Peter K. Kontler

[57] ABSTRACT

A hinge joint which pivotably connects the back to the weight carrying portion of a seat in a motor vehicle has a shaft with two concentric and two eccentric cylindrical portions. The component which is attached to the back has an internal gear mating with a spur gear of the component which is attached to the weight carrying portion of the seat. One of the components is rotatably mounted on the concentric cylindrical portions of the shaft, and the other component surrounds with a small clearance one of the eccentric cylindrical portions. The other eccentric cylindrical portion is surrounded by the prong-like segments of a diaphragm spring or by discrete segments to compensate for radial clearance between the mating teeth of the gears on the two components. Abutments are provided on the segments and/or on the other component to prevent tilting of the segments beyond positions of minimal inclination relative to the other component to thus ensure that each of the segments can be caused to change its inclination in response to engagement by the apex of the other eccentric cylindrical portion when the shaft is caused to turn in order to change, or to permit a change of, the inclination of the back relative to the weight carrying portion of the seat. The shaft need not move axially in response to turning about the common axis of its concentric cylindrical portions.

20 Claims, 9 Drawing Sheets

HINGE JOINT FOR SEATS OF MOTOR VEHICLES AND THE LIKE

CROSS REFERENCE TO RELATED CASES

A hinge joint with a shaft having a single eccentric is disclosed in commonly owned U.S. Pat. No. 4,715,656 granted Dec. 29, 1987 to Hansjörg Walk and Hans-Jürgen Wagener for "Hinge joints for the seats of motor vehicles and the like". A hinge joint with a shaft having a single eccentric is further disclosed in commonly owned copending patent application Ser. No. 070,923 filed July 8, 1987 by Horst Mahling et al. for "Hinge joint for seats of motor vehicles and the like". An adjusting mechanism for hinge joints is disclosed in commonly owned copending patent application Ser. No. 930,252 filed Nov. 12, 1986 by Bernd Engels for "Apparatus for adjusting the seats of motor vehicles".

BACKGROUND OF THE INVENTION

The invention relates to improvements in hinge joints of hinge fittings in general, and more particularly to improvements in hinge joints which can be utilized with advantage on seats of motor vehicles, especially to permit adjustments of inclination of the back relative to the weight carrying part of a seat. Still more particularly, the invention relates to improvements in hinge joints of the type wherein the inclination of a pivotable component with reference to a second component can be altered by changing the angular position of a shaft, a pintle or an analogous coupling element, either by a manually operated device or by a motor.

Commonly owned U.S. Pat. No. 4,708,392 granted Nov. 24, 1987 to Heinz Werner et al. discloses a hinge joint wherein the shaft is provided with a cylindrical eccentric for one gear of the transmission between the two components and with a frustoconical eccentric surrounded by the internal surface of a supporting member which is affixed to the weight carrying part of the seat. The eccentricity of the frustoconical eccentric exceeds that of the cylindrical eccentric, and the frustoconical eccentric serves to effect an axial movement of the shaft and of the member which engages the frustoconical eccentric relative to each other while the shaft is rotated to effect a radial movement of the aforementioned member, i.e., to eliminate radial play between mating parts of the transmission. The magnitude of radial forces increases in response to rotation of the shaft, and this entails an axial movement of the shaft in order to permit a reduction of the force which is necessary to change the angular position of the shaft. When the adjustment is completed the shaft should remain in the newly selected axial position until but is likely to leave such position as a result of vibration and/or other stray movements when the vehicle is in motion. The extent of axial shifting of the shaft during angular displacement depends on the magnitude of tolerances between mating parts of the transmission. Such axial shifting contributes to complexity of the adjusting mechanism for the seat, especially if each seat is equipped with two hinge joints, one at each of its sides. As a rule, the shaft of one of the hinge joints is connected with the shaft of the other hinge joint by a torque transmitting device in the form of a rod or the like so that a single handwheel or a single motor will suffice to simultaneously turn both shafts when the occupant of the seat desires to change the inclination of the back. The torque transmitting mechanism between the shafts of the two hinge joints must be designed with a view to take into consideration axial movability of the shafts.

OBJECTS AND SUMMARY OF THE INVENTION

An object of the invention is to provide a hinge joint which exhibits the advantages of a hinge joint with a cylindrical eccentric and a non-cylindrical eccentric but wherein the shaft need not move axially in response to angular displacement.

Another object of the invention is to provide a hinge joint which is constructed and assembled with a view to permit the utilization of a simple, rugged and inexpensive torque transmitting connection between its shaft and the shaft of an associated hinge joint.

A further object of the invention is to provide a hinge joint wherein the elimination of radial play between the parts of the transmission does not necessitate any axial shifting of the shaft.

An additional object of the invention is to provide a seat, particularly for use in a motor vehicle, which embodies one or more hinge joints of the above outlined character.

Still another object of the invention is to provide novel and improved means for eliminating the need for axial shifting of the shaft in a hinge joint wherein the shaft includes or carries several eccentrics.

An additional object of the invention is to provide a hinge joint wherein the shaft is operatively connected with the leaves of the joint in a novel and improved way.

A further object of the invention is to provide the hinge joint with novel and improved means for reducing wear upon the parts of the transmission and upon the shaft.

An additional object of the invention is to provide a hinge joint wherein one of the leaves can be adjusted relative to the other of the leaves in response to the exertion of a relatively small force.

Another object of the invention is to provide the above outlined hinge joint with a novel and improved shaft and to provide a novel and improved method of installing the shaft in the leaves of the hinge joint The improved hinge joint is especially suited for changing the mutual positions of two portions of a seat in a motor vehicle and comprises first and second components (e.g., in the form of leaves) having mating gears with freedom of radial movement relative to each other, and a coupling element which defines a pivot axis for one of the components, which is surrounded by the gears and which is turnable about the pivot axis to thereby change the angular position of the second component relative to the first component. The coupling element includes first and second substantially cylindrical portions which are eccentric with reference to the pivot axis and at least one additional substantially cylindrical portion whose axis coincides with the pivot axis. The one component is rotatably mounted on the additional cylindrical portion, and one of the first and second cylindrical portions is rotatably mounted in the other of the two components. The hinge joint further comprises annular stressing means which surrounds the other of the first and second cylindrical portions and serves to urge the other component axially or radially and axially from the one component. Such stressing means includes a plurality of tiltable segments which are movable by the other cylindrical portion of the coupling element between positions of lesser inclination and positions of greater inclination in response to turning of the coupling element relative to the other component, and the hinge joint further comprises abutment means for preventing a tilting of the segments beyond the positions of lesser inclination.

The stressing means can comprise a diaphragm spring having an annular outer marginal portion. The segments of such stressing means can include prongs which are rigid with and extend substantially radially inwardly from the marginal portion toward the other cylindrical portion of the coupling element. Alternatively, the stressing means can comprise at least one annulus of discrete segments and means for biasing the segments toward the positions of lesser inclination. Such biasing means can comprise a plurality of resilient elements (e.g., one resilient element per segment, one resilient element for two or more neighboring segments or more than one resilient element per segment) or a resilient element which is common to all segments of the at least one annulus (in such hinge joint, the segments of at least one annulus can be provided with suitable retainers for the common resilient element (e.g., a coil spring) so that the latter is properly centered relative to the coupling element).

In accordance with a presently preferred embodiment, the additional cylindrical portion and the other cylindrical portion of the coupling element each include two coaxial parts, the one cylindrical portion is disposed between the parts of the additional cylindrical portion, and the parts of the additional cylindrical portion are disposed between the parts of the other cylindrical portion. The one component of such hinge joint preferably includes two sections (e.g., in the form of shells) each rotatably mounted on one part of the additional cylindrical portion, and the stressing means for such hinge joint includes two annuli of segments each surrounding one part of the other cylindrical portion.

Antifriction bearing means can be installed between the one component and the one cylindrical portion, and such bearing means preferably surrounds the one cylindrical portion with radial clearance. The bearing means may but need not comprise a ring-shaped inner race which defines the clearance with the one cylindrical portion of the coupling element.

The coupling element can constitute a shaft or pintle. Alternatively, the coupling element can comprise a shaft which is turnable about the pivot axis and a sleeve which is mounted on the shaft and includes the first and second eccentric cylindrical portions of the coupling element. The shaft and the sleeve can be provided with means for non-rotatably connecting the sleeve to the shaft; for example, the shaft can include a stub having a non-circular outline and the sleeve can be provided with a complementary socket for the stub.

If the additional cylindrical portion of the coupling element includes first and second parts and the first and second cylindrical portions of the coupling element are disposed between the first and second parts of the additional cylindrical portion, the second cylindrical portion is preferably adjacent and extends radially beyond one of the first and second parts, the first cylindrical portion preferably extends radially beyond the second cylindrical portion, and the other of the first and second parts preferably extends radially beyond the first cylindrical portion. In other words, the cross-sectional area of the coupling element can decrease stepwise in a direction from one axial end toward the other axial end of the coupling element. This renders it possible to install the coupling element in the first and second components from one side of the first or second component. The one component then preferably includes a first portion (e.g., an axially offset portion of such component) which is rotatably mounted on the first part of the additional cylindrical portion and a second portion (e.g., a cheek which is separable from the main section of the one component) which is rotatably mounted on the second part of the additional cylindrical portion of the coupling element.

At least segment of each annulus of segments forming part of the stressing means is preferably out of contact with the other cylindrical portion of the coupling element in each angular position of the coupling element.

The aforementioned abutment means can be provided on the segments and/or on the other component, e.g., on the gear which is rigid with such other component.

The hinge joint can further comprise means (such as mating external and internal teeth) for non-rotatably connecting the segments of the stressing means to the other component.

The aforementioned clearance is or can resemble a substantially sickle-shaped gap.

The novel features which are considered as characteristic of the invention are set forth in particular in the appended claims. The improved hinge joint itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1a is a fragmentary sectional view as seen in the direction of arrows from the line 1a–1a of FIG. 1;

DESCRIPTION OF THE PREFERRED EMBODIMENTS

Figure 1:
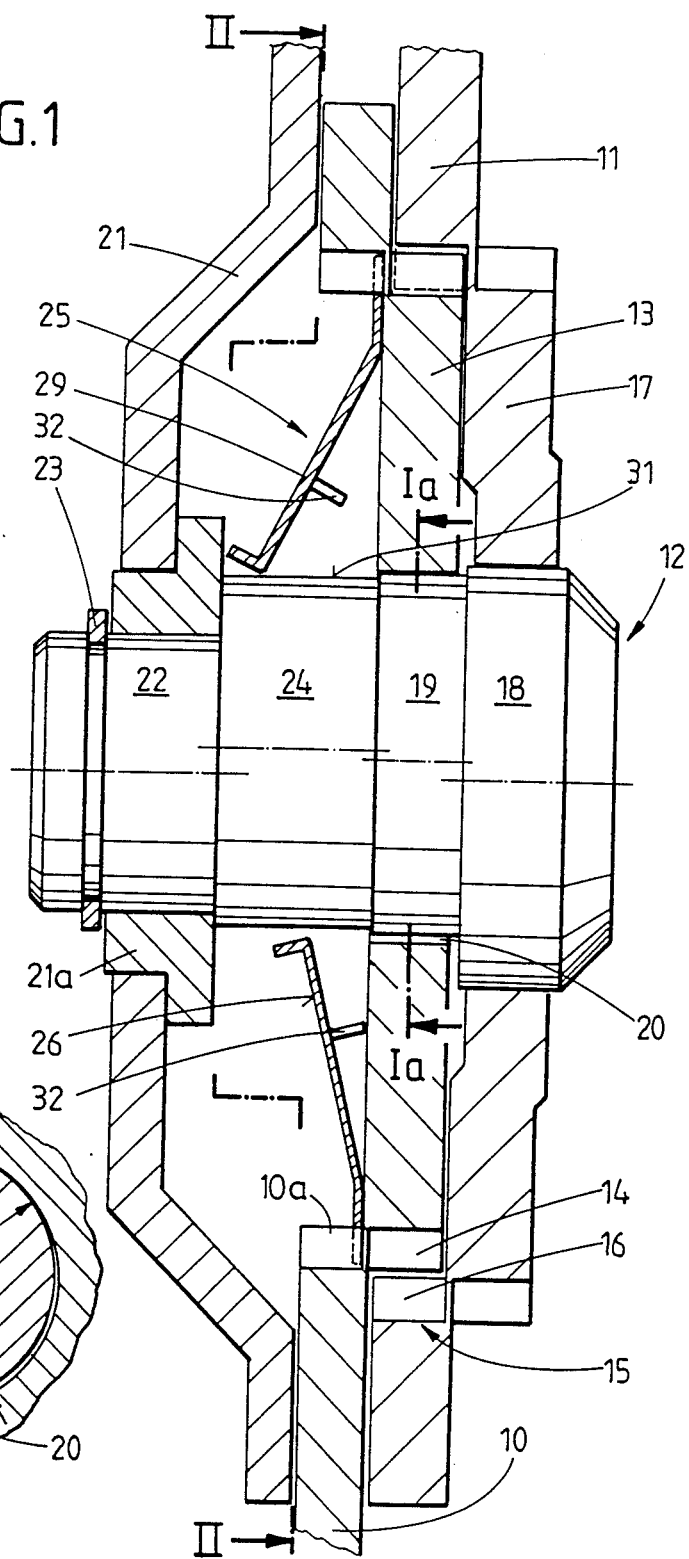
FIG. 1 is a fragmentary sectional view of a hinge joint or hinge fitting which embodies one form of the invention and employs a one-piece stressing member in the form of a diaphragm spring.
Figure 2:
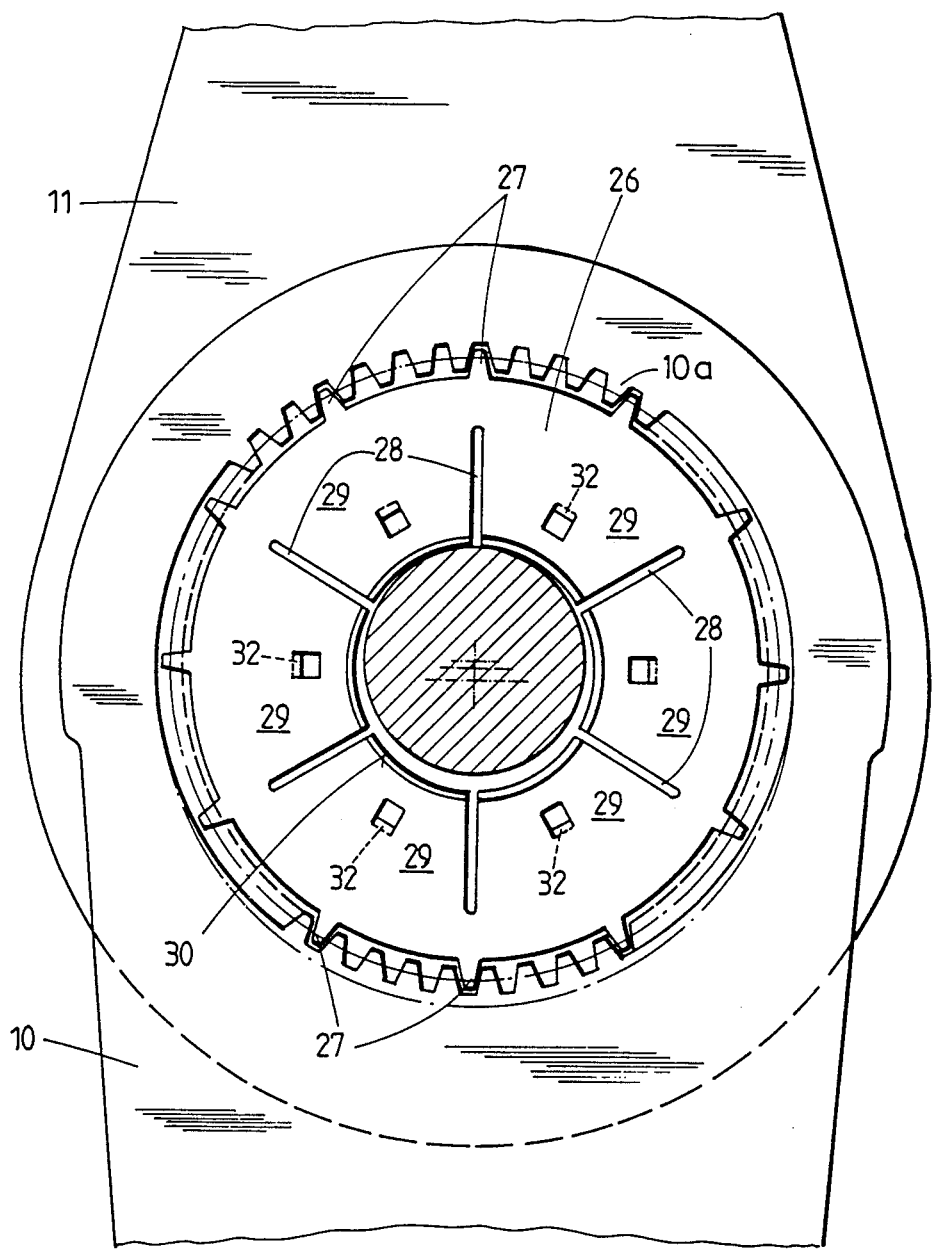
FIG. 2 is a fragmentary sectional view as seen in the direction of arrows from the line II—II of FIG. 1.

The hinge joint which is shown in FIGS. 1, 1a and 2 comprises a first component 10 which constitutes one of the two leaves of the joint, a second component 11 which constitutes the other of the two leaves, and a coupling element in the form of a pintle or shaft 12 defining for the components 10 and 11 a pivot axis around which the component 11 moves relative to the component 10 when the shaft 12 is turned about such axis. The component 10 is assumed to be attached to the weight-supporting part of a seat in a motor vehicle, and the component 11 is assumed to be attached to the back of such seat, i.e., the inclination of the back of the seat with reference to the weight supporting part changes in response to turning of the shaft 12. The latter can be turned by a handwheel or knob, e.g., in a manner as described and shown in commonly owned U.S. Pat. No. 4,563,039 to Jörg, or by a motor in a manner to be described with reference to FIG. 9. The illustrated hinge joint can be installed at one side of the seat, and a similar hinge joint which is a mirror image of the illustrated joint can be installed at the other side of the same seat. The two shafts can be integral with each other or they can be connected to each other by a torque transmitting element in the form of a rod, shaft spindle or the like so that the components 11 of both hinge joints invariably pivot with reference to the respective components 10 through identical angular increments.

The component 10 includes an axially offset portion 13 which constitutes a spur gear with an annulus of peripheral teeth 14 some of which mesh with the teeth 16 of an internal gear 15 forming part of the component 11. The number of teeth 16 equals n30 m wherein n is the number of teeth 14 and m is a whole number including one, i.e., the number of teeth 16 exceeds the number of teeth 14 by at least one. The component 11 further includes an axially offset portion 17 which surrounds a cylindrical portion 18 of the shaft 12. The latter further includes a cylindrical portion 22 which is coaxial with the cylindrical portion 18 and defines with the latter the aforementioned pivot axis for the component 11, a cylindrical or substantially cylindrical portion 19 (hereinafter called first eccentric) which is surrounded with at least some clearance (indicated at 20) by the spur gear 13 of the component 10, and a cylindrical portion 24 (hereinafter called second eccentric) which is surrounded by an annular stressing or supporting member 25 (hereinafter called ring for short). The axes of the eccentrics 19, 24 are offset relative to each other as well as to the common axis of the cylindrical portions 18 and 22. All of these axes are indicated in FIG. 1 by phantom lines. The cylindrical portion 22 of the shaft 12 is surrounded by a bearing sleeve which, in turn, is installed in a portion or cheek 21 of the component 11. The cheek 21 is secured to the main portion of the component 11 in a well known manner not forming part of the present invention. The bearing sleeve 21a and the cheek 21 are held against axial movement relative to the shaft 12 and vice versa by a split ring 23 which extends into a circumferential groove of the shaft 12 adjacent that axial end of the cylindrical portion 22 which is remote from the second eccentric 24.

The cylindrical portion 18 constitutes the maximum-diameter part of the shaft 12 and the eccentrics 19, 24 (which are adjacent each other and are disposed between the cylindrical portions 18, 22) do not extend radially beyond the peripheral surface of the cylindrical portion 18. This is desirable and advantageous because the shaft 12 can be inserted into the axially offset portion 17 of the component 11, into the spur gear 13 of the component 10, into the central opening 30 of the ring 25 and into the bearing sleeve 21a of the cheek 21 from one side of the hinge joint to thus simplify the assembly of the improved hinge joint. The eccentricity of the eccentric 24 with reference to the common axis of the cylindrical portions 18, 22 of the shaft 12 is somewhat greater than that of the eccentric 19. As can be seen in FIG. 1a, the radius of the eccentric 19 (which is a nearly cylindrical portion of the shaft 12) matches or is only slightly less than the radius $R_3$ of the central opening of the spur gear 13. The center of curvature of the upper half of the peripheral surface of the eccentric 19 (as seen in FIG. 1a) is located on the axis of the eccentric 19 (note the radius $R_1$ in FIG. 1a); however, the center of curvature of the lower half of the peripheral surface of the eccentric 19 (note the radius $R_2$ in FIG. 1a) is located on the axis of the eccentric 24. This causes the establishment of the substantially crescent-shaped clearance 20 which can be best seen in FIG. 1a and is adjacent the lower half of the peripheral surface of the eccentric 19 within the confines of the spur gear 13. The radius $R_3$ of the surface surrounding the bore or hole in the spur gear 13 constant.

The ring 25 of the hinge joint which is shown in FIGS. 1, 1a and 2 includes or constitutes a diaphragm spring or dished spring 26 having a circumferentially complete outer marginal portion and a set of radially inwardly extending tiltable segments or prongs 29 separated from each other by relatively narrow slots 28. The slots 28 terminate short of the radially outermost part of the outer marginal portion so that the prongs 29 form part of a one-piece diaphragm spring. The marginal portion of the diaphragm spring 26 has an annulus of radially outwardly extending projections in the form of teeth 27 mating with the neighboring internal teeth 10a of the main portion of the component 10, i.e., the diaphragm spring 26 and the component 10 cannot turn relative to each other. The radially innermost portions of the prongs 29 are suitably bent so as to extend toward the bearing sleeve 21a of the cheek 21, and at least one of these prongs is engaged by and reformed by the apex 31 of the peripheral surface of the eccentric 24, namely by that portion of such peripheral surface which is remotest from the common axis of the cylindrical portions 18,22 of the shaft 12. Each prong 29 has a tendency to tilt relative to he outer marginal portion of the diaphragm spring 26 in a direction to move its tip toward the adjacent side of the spur gear 13. In order to ensure that the inclination of the prongs 29 with reference to the adjacent radially extending surface of the spur gear 13 cannot be reduced beyond a predetermined minimum value, each prong 29 comprises an abutment 32 which strikes or comes rather close to the adjacent surface of the spur gear 13 when the respective prong is not deformed by the eccentric 24, i.e., when this eccentric is out of contact with the tip of a prong.

The bias of the diaphragm spring 26 suffices to ensure that the uppermost teeth 14 of the spur gear 13 mate with the adjacent teeth 16 of the internal gear 15 without play or with a minimum of play. As can be seen in FIG. 2, one or more topmost prongs 29 of the diaphragm spring 26 are deformed (tilted relative to the main section of the diaphragm spring) by the peripheral surface of the eccentric 24 in the region of the apex 31 of such surface while at least one of the prongs 29 opposite such deformed or tilted prong or prongs is free to move its tip relative to the eccentric 24 until its abutment 32 reaches and is arrested by the spur gear 13. Each abutment 32 can constitute a suitably bent integral portion of the respective prong 29; however, it is equally within the purview of the invention to employ separately produced abutments which are welded, riveted or otherwise reliably affixed to the respective prongs 29 in order to ensure that the extent to which the prongs are tilted relative to the plane of the spur gear cannot be reduced beyond a predetermined minimum value which suffices to guarantee that the inclination of such prongs will increase automatically when the shaft 12 is turned to move the apex 31 of the peripheral surface of the eccentric 24 into engagement with the tips of such prongs.

The apex 31 is adjacent the apex of the peripheral surface of the eccentric 19, i.e., the axes of the eccentrics 19, 24 are disposed at the same side of the common axis of the cylindrical portions 18, 22 of the shaft 12 (this can be readily ascertained by observing the aforementioned phantom lines shown in FIG. 1 and denoting the axes of the eccentrics 19, 24 and cylindrical portions 18, 22 of the shaft 12). Such positioning of the two apices relative to each other ensure that, when the shaft 12 is turned by the aforementioned handwheel or by a motor, the eccentric 19 invariably maintains the teeth 14 of the spur gear 13 in mesh with the adjacent teeth 16 of the internal gear 15. The radial play between the teeth 14 and 16 (such unavoidable radial play is due to machining tolerances and/or to wear) ensures that, when the shaft 12 is turned, there is sufficient clearance between the mating teeth 14, 16 as well as between the spur gear 13 and the eccentric 19 diametrically opposite the locus of mesh of teeth 14 and 16. As explained above and as shown in FIG. 1, that prong or those prongs 29 which is nearest to the locus of mesh of one or more teeth 14 with one or more teeth 16 (in the region of the apex 31) undergo maximum deformation or tilting so that their tips are immediately or closely adjacent or actually engage the adjacent surface of the bearing sleeve 21a in the cheek 21 of the component 11. As the shaft 12 continues to turn, the eccentric 24 automatically deforms successive prongs 29 by increasing their inclination with reference to the plane of the spur gear 13 while also permitting successive prongs 29 at the other side of the apex 31 to reduce the extent of their inclination relative to the plane of the spur gear 13 so that the abutments 32 of such prongs move axially of the shaft 12 toward and eventually into actual contact with the spur gear (or close to a position of actual contact with the spur gear). In this manner, each of the prongs 29 can compensate for radial tolerances between the neighboring mating teeth 14 and 16. Since the component 10 is assumed to be affixed to the weight carrying part of the seat in the motor vehicle (i.e., since the component 10 cannot yield in response to turning of the shaft 12), the shaft 12 moves radially together with the component 11 which latter does not have any (or much) freedom of radial movement relative to the shaft since its axially offset portion 17 directly surrounds (preferably with a minimum of play) the cylindrical portion 18 of the shaft. This eliminates or adequately reduces radial play between the gears 13, 15 and also between the components 10 and 11.

An advantage of the improved hinge joint is that the shaft 12 need not move axially in response to rotation about its axis. This contributes to a simplification of the torque transmitting connection between the shaft 12 and the shaft of the hinge joint at the other side of the seat. The shaft 12 need not move axially because it is provided with two cylindrical eccentrics and the axial movements are carried out by portions of the prongs 29, namely by the innermost portions or tips of those prongs which are acted upon by the apex 31 of the peripheral surface of the eccentric 24 or by the innate elasticity of the ring 25 and the tendency of its diaphragm spring 26 to maintain the abutments 32 of the prongs 29 in contact with or close to the spur gear 13. The abutments 32 ensure that the inclination of the prongs 29 relative to the plane of the spur gear 13 cannot be reduced below a minimum value which is still sufficient to ensure automatic advancement of the tips of prongs 29 toward the bearing sleeve 21a in the cheek 21 when the shaft 12 is turned so that the apex 31 of the peripheral surface of the eccentric 24 moves beyond successive prongs 29 toward and into deforming engagement with the prongs ahead of the apex. In other words, those prongs 29 which are not in actual engagement with the eccentric 24 are maintained in positions of readiness (i.e., in positions of minimum inclination as determined by the respective abutments 32) for engagement by the apex 31 of the peripheral surface of the eccentric 24 in response to angular displacement of the shaft 12. Axial shifting of the tips of prongs 29 in response to angular displacement of the shaft 12 takes place in lieu of axial movement of the shaft in accordance with the invention which is disclosed in U.S. Pat. No. 4,708,392 to Werner et al. The shaft 12 and the component 11 merely move radially so as to eliminate or greatly reduce radial play between the parts of the transmission including the gears 13 and 15.

Another advantage of the improved hinge joint is that it can employ a relatively simple shaft which need not have a cylindrical and a frustoconical eccentric. Furthermore, it is simpler to design the ring 25 with view to be properly acted upon by a cylindrical eccentric (24) than by a frustoconical eccentric. All this contributes to simplicity, ruggedness and lower cost of the improved hinge joint. Still another advantage which contributes to simplicity, compactness and lower cost of the hinge joint is that the latter can operate with a single ring 25. This entails some non-symmetrical (one sided) stressing of the one and/or the other component of the hinge joint; however, such one-sided stressing is minimal because the non-symmetrical stressing of the one and/or the other component is not pronounced.

Figure 3:
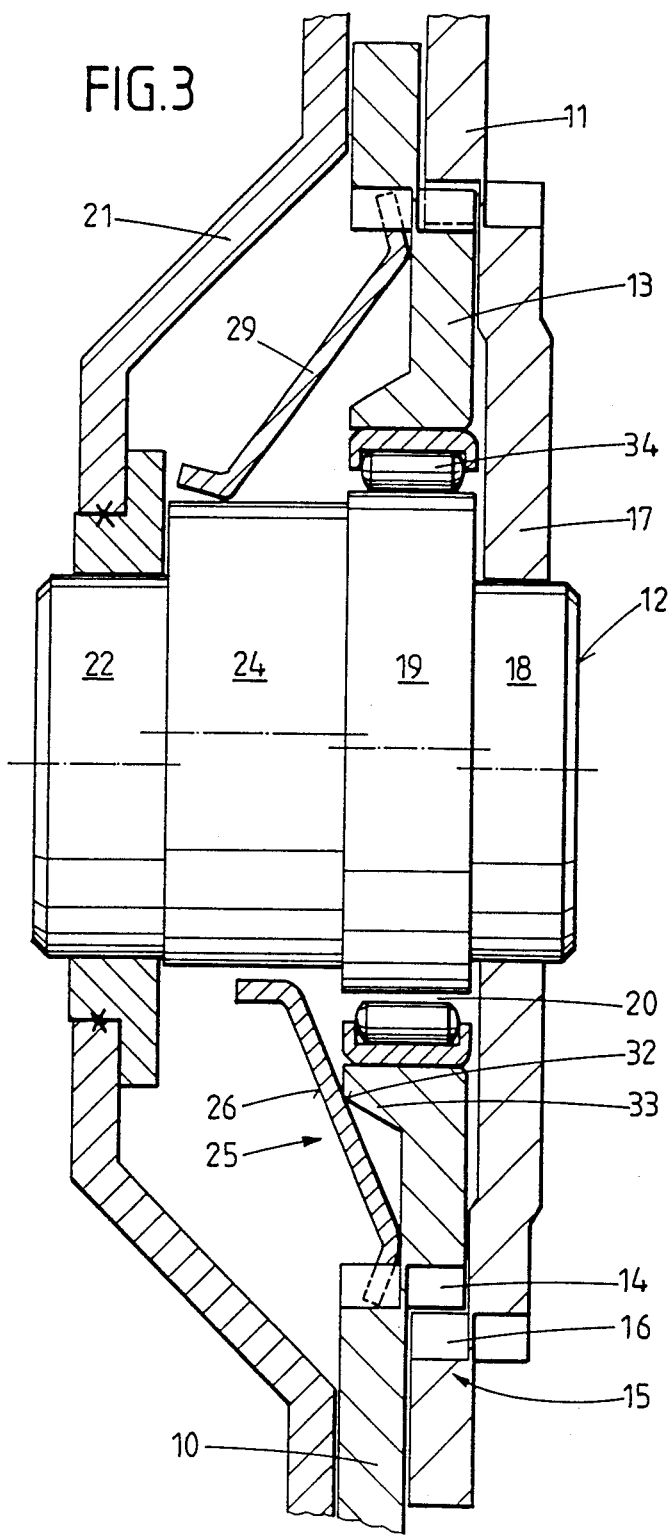
FIG. 3 is a fragmentary longitudinal sectional view of a second hinge joint which employs a modified stressing member and a modified back-supporting component.

FIG. 3 shows a portion of a modified hinge joint wherein all such parts which are identical with or clearly analogous to the corresponding parts of the hinge joint of FIGS. 1, 1a and 2 are denoted by similar reference characters. The modified hinge joint employs a simpler supporting or stressing member (ring) 25 whose diaphragm spring 26 need not be provided with abutments 32, one for each prong 29. Instead, the spur gear 13 of the component 10 has a single abutment in the form of a ring-shaped bead 33 spacedly surrounding the eccentric 19 and having a circular edge 32 serving to limit the extent of tiltability of those prongs 29 which are not in direct contact with and are not tilted by the peripheral surface of the eccentric 24.

Another difference between the hinge joint of FIG. 3 and that of FIGS. 1, 1a and 2 is that the spur gear 13 of the component 10 shown in FIG. 3 surrounds the outer race of an antifriction bearing 34 whose rolling elements (e.g., in the form of cylinders) can roll directly along the peripheral surface of the eccentric 19. Again, the peripheral surface of the eccentric 19 and the surface surrounding the central opening of the spur gear 13 (namely the opening defined by the rolling elements of the antifriction bearing 34) define a substantially sickle-shaped clearance 20.

An advantage of the hinge joint of FIG. 3 is that the shaft 12 can be turned in response to the exertion of a relatively small force. This is due to the provision of the antifriction bearing 34. On the other hand, the hinge joint of FIGS. 1, 1a and 2 is simpler because it merely employs friction bearings.

Figure 4:
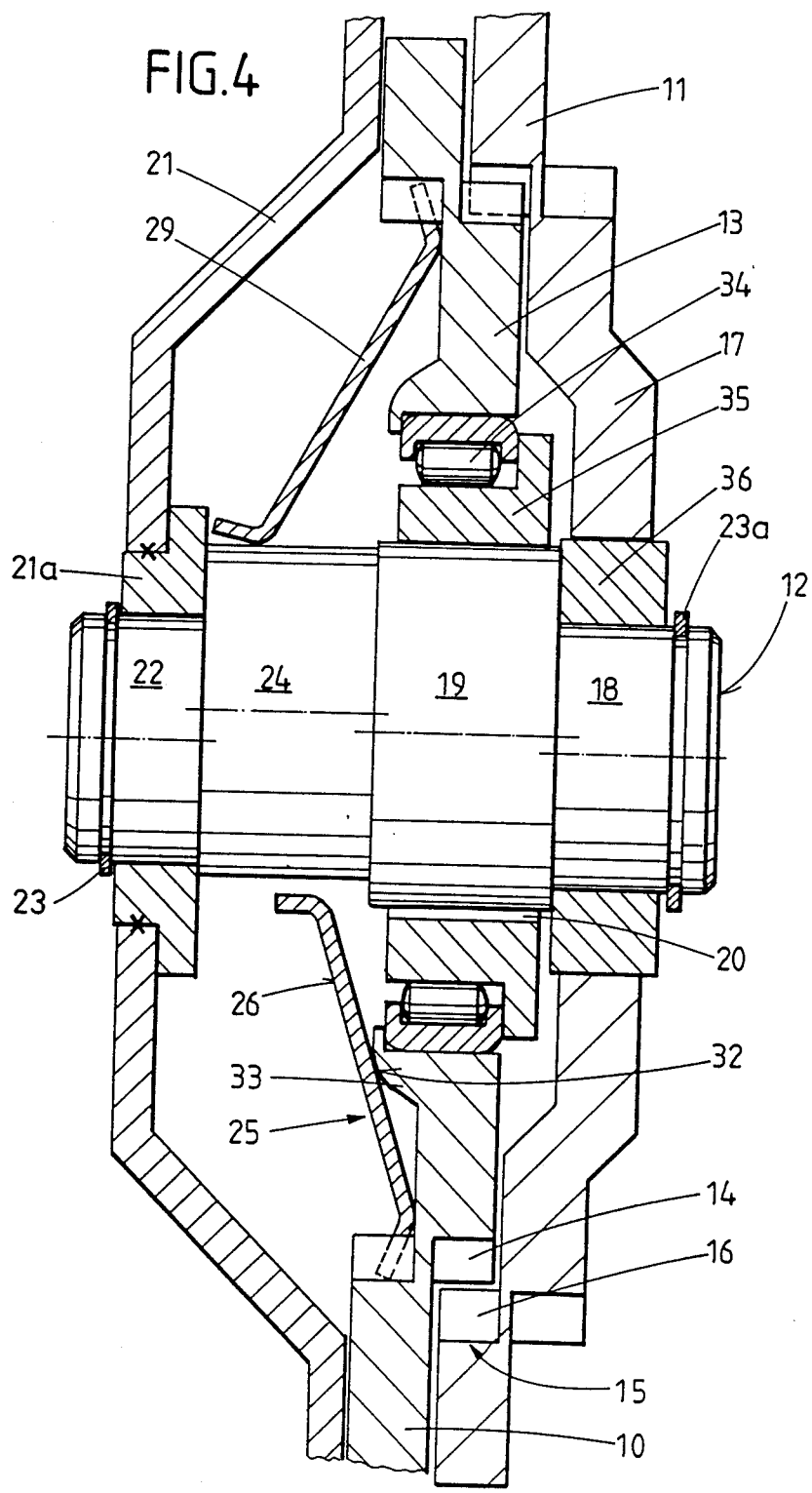
FIG. 4 is a similar fragmentary longitudinal sectional view of a hinge joint which constitutes a first modification of the hinge joint of FIG. 3.

FIG. 4 shows a first modification of the hinge joint of FIG. 3. The antifriction bearing 34 of FIG. 4 comprises an inner race 35 in the form of a bearing sleeve whose internal surface and the peripheral surface of the eccentric 19 on the shaft 12 define a sickle-shaped clearance 20. Another bearing sleeve 36 is installed in the axially offset portion 17 of the component 11 and closely surrounds the cylindrical portion 18 of the shaft 12. The outer diameter of the sleeve 36 is selected in such a way that the sleeve extends radially beyond the other portions 19, 24, 22 of the shaft 12 so that the latter (with the sleeve 36 already mounted on its cylindrical portion 18) can be inserted into the portion 17 of the component 11, into the inner race 35 of the antifriction bearing 34, into the central opening of the ring 25, and into the bearing sleeve of the cheek 21 from the right-hand side of the component 11.

The hinge joint of FIG. 4 employs two split rings, namely a split ring 23 for the bearing sleeve of the cheek 21, and a split ring 23a which holds the bearing sleeve 36 against movement away from the adjacent end face of the eccentric 19. Furthermore, the pronounced edge 32 of the bead 33 shown in FIG. 3 is omitted; instead, the abutment or bead 33 of FIG. 4 is provided with a convex surface 32 which is contacted by one or more prongs 29 of the diaphragm spring 26 in order to ensure that such prong or prongs cannot reduce their inclination relative to the plane of the spur gear 13 beyond a predetermined minimum value which suffices to guarantee that successive prongs can be readily tilted by the apex of the peripheral surface of the eccentric 24 when the shaft 12 is caused to turn in order to change the inclination of the component 11 relative to the component 10.

The hinge joint of FIG. 4 employs a very simple diaphragm spring 26, a somewhat more complex component 10 (with the bead 32 and convex surface 33) and a bearing 34 which can be fully assembled prior to installation in the spur gear 13 because it has an inner race (constituted by the bearing sleeve 35).

Figure 5:
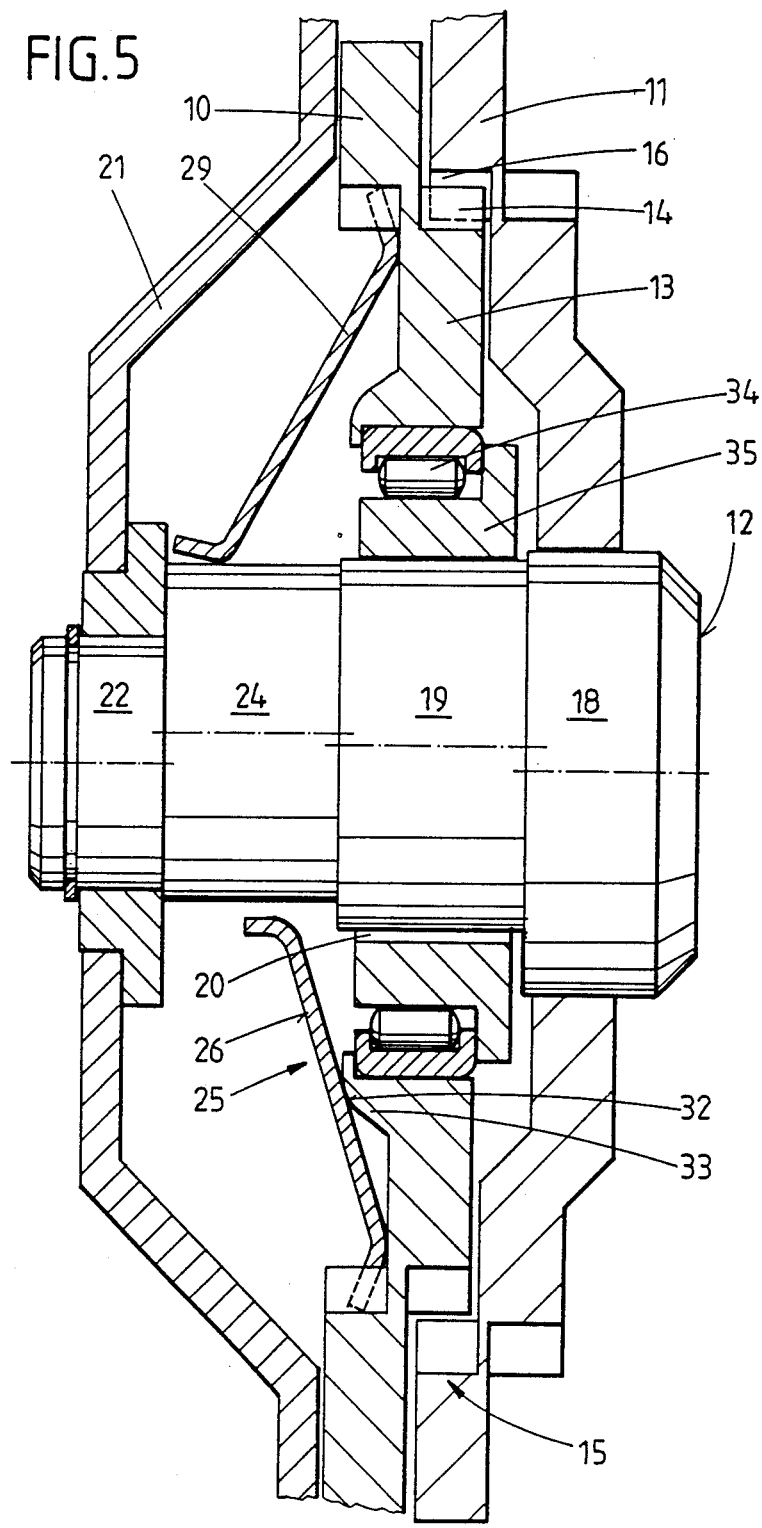
FIG. 5 is a similar view of a hinge joint constituting a second modification of the hinge joint of FIG. 3.

FIG. 5 shows a second modification of the hinge joint of FIG. 3. The antifriction bearing 34 comprises an inner race 35 (as in FIG. 4) which surrounds the eccentric 19 with clearance 20, and the bearing sleeve 36 of FIG. 4 is omitted, i.e., the diameter of the cylindrical portion 18 is greater than that of any other portion of the shaft 12 and none of the portions 19, 22, 24 extend radially beyond the peripheral surface of the portion 18 so that the shaft 12 can be inserted into the components 10, 11 in the same way as described in connection with FIGS. 1, 1a and 2. The eccentric 24 extends radially beyond the cylindrical portion 22, the eccentric 19 extends radially beyond the eccentric 24, and the cylindrical portion 18 extends radially beyond the eccentric 19. The bead or abutment 32 has a convex surface 32 which is in contact with one or more prongs 29 diametrically opposite the apex of the peripheral surface of the eccentric 24 for the ring 25. The hinge joint of FIG. 5 i simpler than that of FIG. 4 because it dispenses with the bearing sleeve 36 and with one of the split rings.

Figure 6:
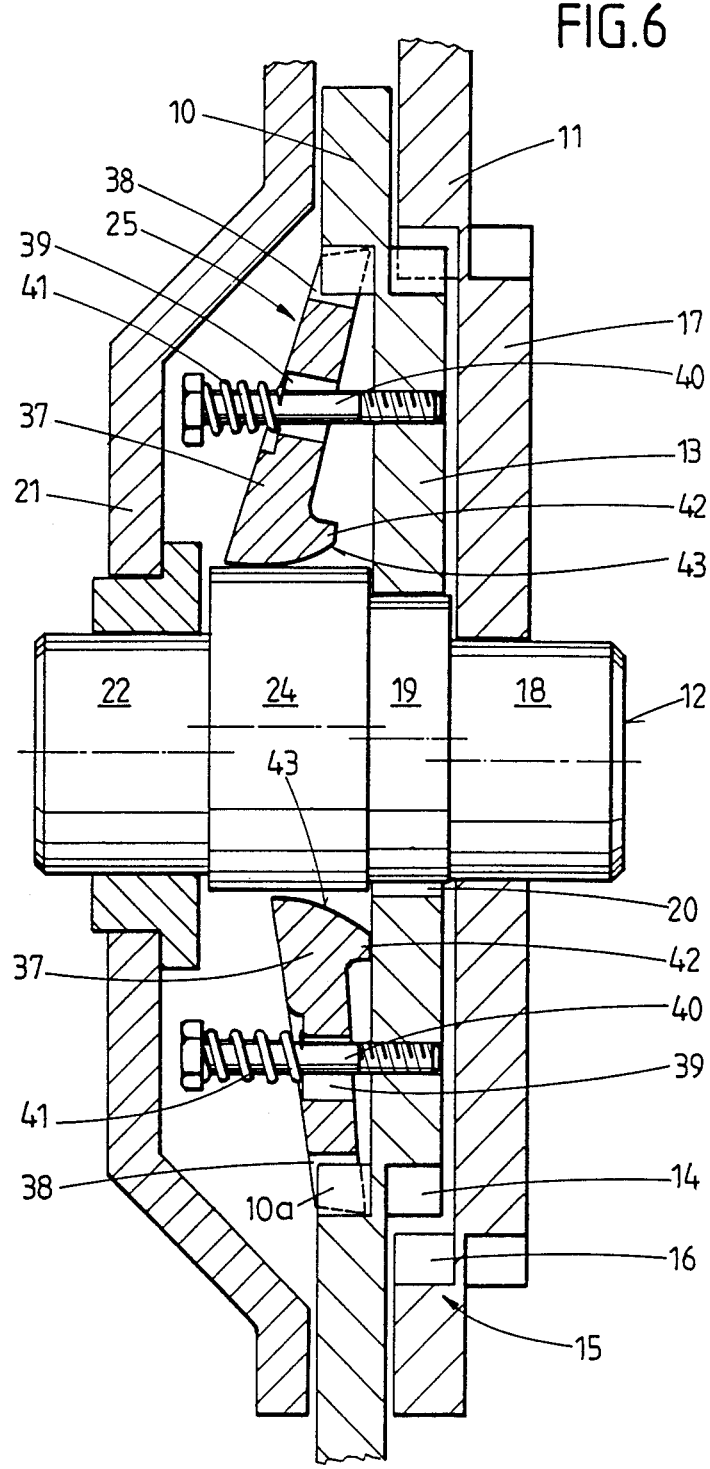
FIG. 6 is a similar view of a hinge joint wherein the stressing member is assembled of an annulus of discrete segments.

FIG. 6 illustrates a further modification of the improved hinge joint wherein the ring 25 is assembled of several discrete segments 37 each of which has a convex surface 43 movable into or being maintained in contact with the peripheral surface of the eccentric 24 on the shaft 12. The segments 37 form an annulus and each such segment has one or more radially outwardly extending projections 38 in the form of teeth mating with the internal teeth 10a of the main portion of the component 10. Furthermore, each segment 37 has a hole or slot 39 which receives with a certain amount of play the shank of a fastener 40 in the form of a threaded bolt. A portion of the shank of each fastener 40 extends into a tapped bore of the spur gear 13, and each bolt 40 has a head serving as a retainer for one end convolution of a coil spring 41 whose other end convolution bears against the adjacent side of the respective segment 37 so that the latter tends to tilt toward a position of minimum inclination with reference to the spur gear 13. Abutments 42 adjacent the convex surfaces 43 of the segments 37 perform the same function as the abutments 32 of prongs 29 on the diaphragm spring 26 of the ring 25 which is shown in FIGS. 1 and 2. The cross-sectional area of each hole or slot 39 suffices to ensure that the respective segment 37 can be tilted by the peripheral surface of the eccentric 24 or by the respective coil spring 41 so that the corresponding segment 37 can change its inclination relative to the plane of the spur gear 13 between that shown in the upper portion of FIG. 1 (in which the radially innermost portion of the segment is close to the bearing sleeve in the cheek 21 of the component 11) and that shown in the lower part of FIG. 6 (in which the abutment 42 is in actual contact with the spur gear 13). The minimum inclination of a segment 37 relative to the plane of the spur gear 13 should suffice to enable the peripheral surface of the eccentric 24 to change (increase) the inclination against the opposition of the respective coil spring 41 in response to rotation of the shaft 12 relative to the component 10. The segments 37 compensate for unavoidable radial play between the mating teeth 14 and 16 of the spur gear 13 and internal gear 15, respectively. The shaft 12 then moves downwardly with the component 11 and is able to perform such movement due to the provision of a clearance or play 20 between the eccentric 19 and the internal surface of the spur gear 13. The clearance between mating teeth 14 and 16 is reduced because the component 11 is compelled to share the downward movement of the shaft 12 relative to the fixedly mounted component 10.

The diameter of the eccentric 24 exceeds those of the eccentric 19 and cylindrical portions 18, 20. The shaft 12 of FIG. 6 is first inserted into the annulus of segments 37, into the spur gear 13 and into the axially offset portion 17 of the component 11, and the bearing sleeve in the cheek 21 is thereupon slipped onto the cylindrical portion 22 before the cheek 21 is affixed to the main portion of the component 11.

Figure 7:
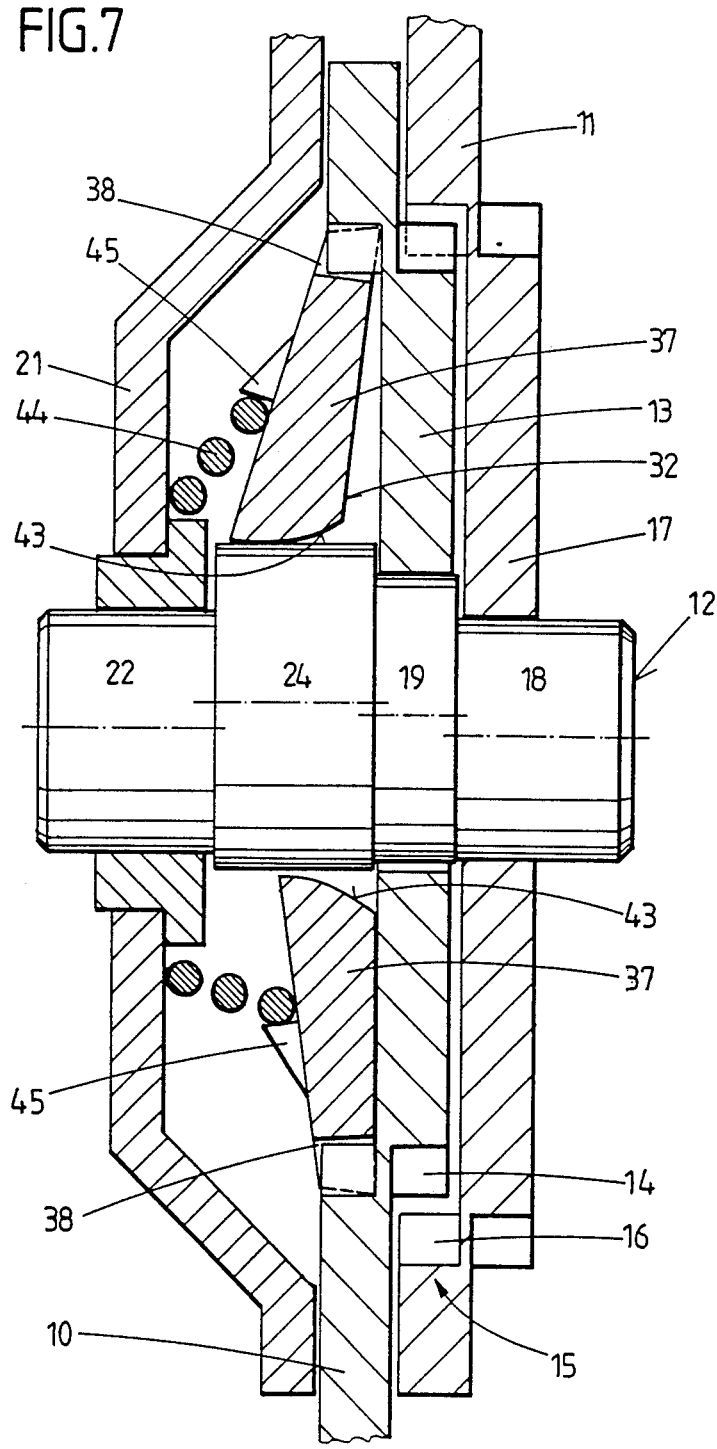
FIG. 7 is a similar view of a modification of the hinge joint of FIG. 6.

The hinge joint of FIG. 7 is similar to that of FIG. 6 except that the discrete segments 37 of the composite ring are jointly biased by a single conical coil spring 44 having a leftmost convolution at the smaller-diameter end in engagement with the cheek 21 of the component 11 and the right-most convolution at the larger-diameter end of the conical frustum in engagement with the respective sides of the segments 37. The segments 37 of FIG. 7 are no provided with discrete abutments; instead, their right-hand surfaces 32 constitute abutments which can come into full or nearly full contact with the adjacent side of the spur gear 13. In order to ensure predictable engagement between the coil spring 44 and the segments 37 (and to thus ensure predictable biasing of all segments toward the spur gear 13), each segment 37 has a retainer 45 which engages the maximum-diameter convolution of the coil spring 44 and centers the spring relative to the shaft 12.

An advantage of the hinge joint of FIG. 7 is its simplicity as well as its low cost. Thus, a single coil spring 44 suffices to adequately bias an entire annulus of segments 37. Furthermore, each of the hinge joints shown in FIGS. 6 and 7 exhibits the advantage that it suffices to replace (when necessary) one or more portions (segments 37) of the composite ring instead of discarding the entire ring (if the latter is a one-piece diaphragm spring or the like).

Figure 8:
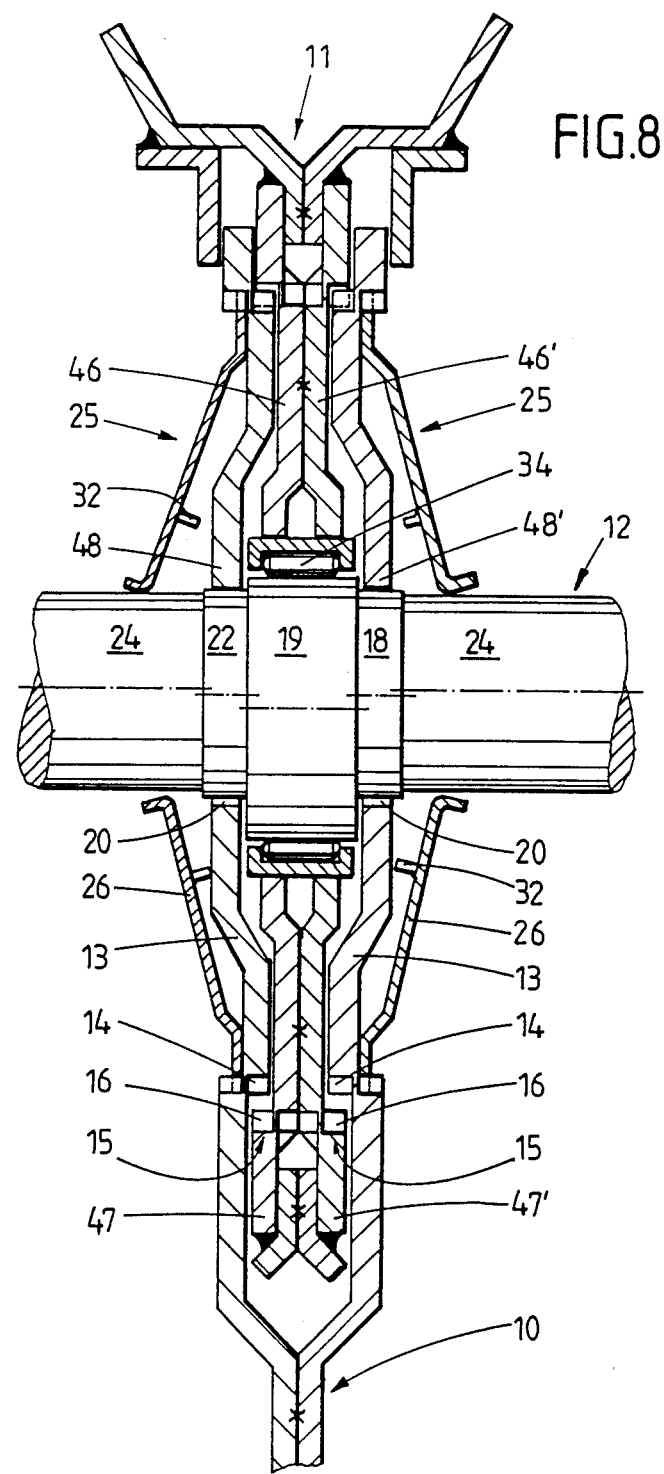
FIG. 8 is a fragmentary longitudinal sectional view of a hinge joint with two stressing members.

FIG. 8 shows a further hinge joint wherein each of the components 10, 11 comprises two mirror symmetrical halves. The component 11 includes two shells or sections 46, 46 which are welded or otherwise rigidly connected to each other and to that part of the component 11 which is affixed to the back of a seat in a motor vehicle. The shells 46, 46' respectively have axially offset collars 47, 47' each of which includes an internal gear 15 with a set of teeth 16. The central portions of the shells 46, 46' surround an antifriction bearing 34 which, in turn, surrounds the eccentric 19 of the shaft 12. The eccentric 19 is disposed between two cylindrical portions 18, 22 which are coaxial with one another and are respectively surrounded by the sections or shells 48', 48 of the composite component 10. The clearance 20 between the component 11 shown in FIGS. 1, 3, 4, 5, 6, 7 and the respective eccentric 19 is replaced by a pair of clearances 20, one between the shell 48 and the cylindrical portion 22, the other between the shell 48' and the cylindrical portion 18. The shells 48, 48' of the component 10 flank the shells 46, 46' of the component 11 and are respectively provided with axially offset spur gears 13 having teeth 14 mating with some teeth 16 of the respective internal gears 15 (on the collars 47, 47' of the shells 46, 46'). The gears 13, 15 in each of the illustrated hinge joints can be obtained by deforming originally flat components or shells, for example, in a manner as disclosed in the aforementioned patent to Jörg. The ratio of teeth 14 to the respective teeth 16 is the same as described in connection with FIGS. 1, 1a and 2. This ensures the component 11 will move relative to the fixedly installed component 10 in response to turning of the shaft 12 by a hand wheel or by a motor.

The hinge joint of FIG. 8 comprises two rings 25 each of which constitutes or includes a diaphragm spring 26 similar to that shown in FIGS. 1, 1a and 2. The radially outermost portions of the diaphragm springs 26 are non-rotatably connected to the respective shells 48, 48' of the component 10, and each of these diaphragm springs has prongs cooperating with the respective halves of a composite eccentric 24 in the same way as described in connection with FIGS. 1, 1a and 2. The halves of the composite eccentric 24 are adjacent the cylindrical portions 18, 22 of the shaft 12. The mode of operation of the hinge joint of FIG. 8 is clearly analogous to that of the previously described hinge joints.

An advantage of the hinge joint of FIG. 8 (with two rings 25) is that each of the components 10, 11 is assembled of two mirror symmetrical halves and that the parts of such components are subjected to balanced symmetrical stresses.

Figure 9:
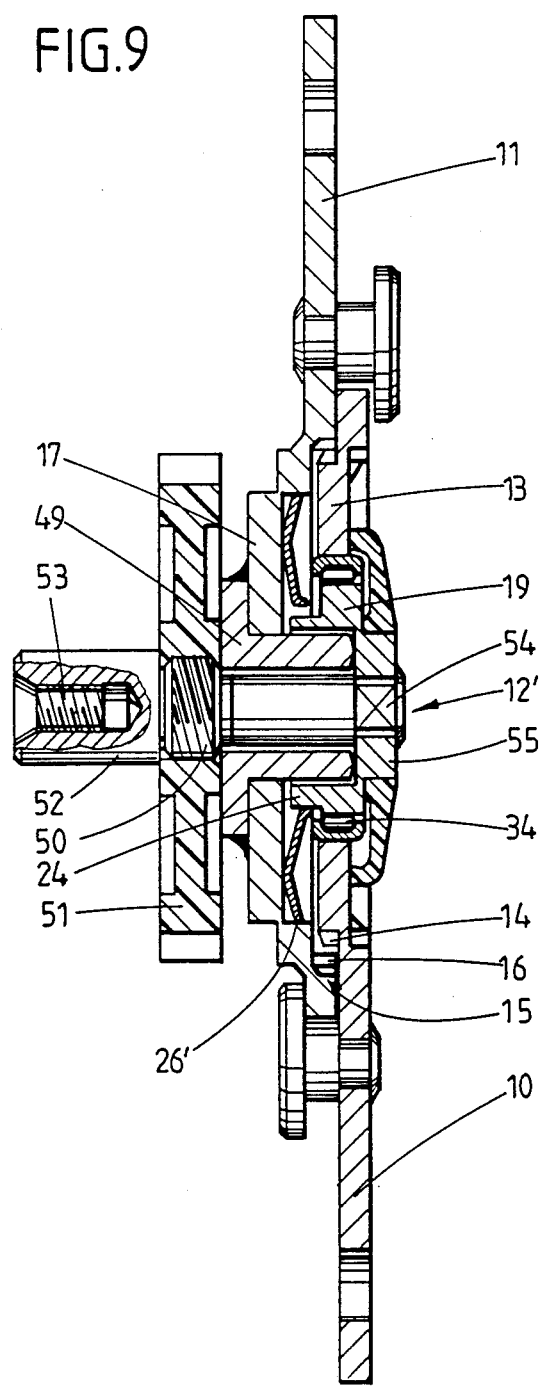
FIG. 9 is a fragmentary longitudinal sectional view of a hinge joint wherein the coupling element includes a shaft and a sleeve which is mounted on the shaft and is provided with several cylindrical eccentrics.

FIG. 9 shows a further hinge joint wherein the component 10 is connected or connectable to the weight carrying part of a seat in a motor vehicle and the component 11 is connected or connectable to the back of such seat. The component 10 has a spur gear 13 with an annulus of teeth 14 in mesh with the teeth 16 of the internal gear 15 forming part of the component 11. The number of teeth 16 exceeds the number of teeth 14. The axially offset portion 17 of the component 11 is affixed to a bearing sleeve 49 which is rotatable on the shaft 12'. The latter forms part of a composite coupling element which further includes a sleeve-like portion 55 having the eccentrics 19, 24 for the spur gear 13 and the diaphragm spring 26', respectively. The shaft 12' includes an externally splined portion 50 which can receive torque from the internal splines of a spur gear 51 constituting the last element of the power train between a reversible motor (not shown) and the shaft 12'.

The splined portion 50 of the shaft 12' is adjacent a cylindrical extension 52 having a tapped axial bore 53 for a torque transmitting element (not shown) which serves to rotate the shaft of the other hinge joint in response to rotation of shaft 12' by the gear 52. The torque transmitting element can include a shaft, a spindle or any other part which can turn the other shaft in response to turning of the shaft 12' by a motor or by a hand wheel. As mentioned in connection with the hinge joint of FIGS. 1, 1a and 2, the back of a seat in a motor vehicle can be movably connected to the weight carrying part of the seat by two hinge joints which are disposed at opposite sides of the weight carrying portion. The provision of a torque transmitting connection between the shafts of the two hinge joints renders it possible to simultaneously turn the components 11 of both hinge joints in response to actuation of a single motor or by way of a single hand wheel, crank or the like. A motor and/or a hand wheel or the like can also be used to turn the shaft (12) in each of the hinge joints shown in FIGS. 1 to 8.

That end portion 54 of the shaft 12' which is remote from the extension 52 constitutes a non-circular stub which is non-rotatably surrounded by the aforementioned sleeve 55 including the eccentrics 19 and 24. The manner in which the sleeve 55 is held on the shaft 12' against axial movement forms no part of the invention. A sealing disc surrounds the sleeve 55 and engages the spur gear 13 to conceal and shield the antifriction bearing 34 which is interposed between the eccentric 19 and the spur gear 13.

The diaphragm spring 26' which surrounds the eccentric 24 of the sleeve 55 is or can be identical with the diaphragm spring 26 of FIGS. 1 and 2. This diaphragm spring is installed in the space within the main portion of the component 11 between the axially offset portion 17 of this component and the spur gear 13 of the component 10. The main section of the draphragm spring 26' is a circumferentially complete annulus which carries a plurality of radially inwardly extending prongs corresponding to the prongs 29 shown in FIGS. 1 and 2. Such prongs cannot be readily seen in FIG. 9 due to the scale of this illustration.

An advantage of the hinge joint of FIG. 9 is its compactness. Moreover, the sleeve 55 can be replaced with a fresh sleeve when the wear upon the eccentrics 19, 24 is sufficiently pronounced to warrant such replacement.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A hinge joint, particularly for changing the mutual positions of two portions of a seat in a motor vehicle, comprising first and second components having mating gears with freedom of radial movement relative to each other; a coupling element defining a pivot axis for one of said components, surrounded by said gears and being turnable about said pivot axis to thereby change the angular position of said second component relative to said first component, said coupling element including first and second substantially cylindrical portions eccentric with reference to said pivot axis and at least one additional substantially cylindrical portion having an axis which coincides with said pivot axis, said one component being rotatably mounted on said additional cylindrical portion and one of said first and second cylindrical portions being rotatably mounted in the other of said components; annular stressing means surrounding the other of said first and second cylindrical portions and arranged to urge said other component axially of said one component, said stressing means including a plurality of tiltable segments which are movable by said other cylindrical portion between positions of lesser inclination and positions of greater inclination in response to turning of said coupling element relative to said other component; and abutment means for preventing a tilting of said segments beyond said positions of lesser inclination.

2. The hinge joint of claim 1, wherein said stressing means includes a diaphragm spring having an annular outer marginal portion, said segments including prongs rigid with and extending substantially radially inwardly from said marginal portion toward said other cylindrical portion of said coupling element.

3. The hinge joint of claim 1, wherein said additional cylindrical portion and said other cylindrical portion each include two coaxial parts, said one cylindrical portion being disposed between the parts of said additional cylindrical portion and the parts of said additional cylindrical portion being disposed between the parts of said other cylindrical portion, said one component having two sections each rotatably mounted on one part of said additional cylindrical portion, said stressing means including two annuli of segments each surrounding one part of said other cylindrical portion.

4. The hinge joint of claim 1, wherein said stressing means comprises at least one annulus of discrete segments and means for biasing said segments toward said positions of lesser inclination.

5. The hinge joint of claim 4, wherein said biasing means comprises a plurality of resilient elements.

6. The hinge joint of claim 4, wherein said biasing means comprises a resilient element common to all segments of said at least on annulus.

7. The hinge joint of claim 6, wherein said segments of said at least one annulus have retainers for said common resilient element.

8. The hinge joint of claim 1, further comprising antifriction bearing means interposed between said one component and said one cylindrical portion.

9. The hinge joint of claim 8, wherein said bearing means surrounds said one cylindrical portion with radial clearance.

10. The hinge joint of claim 9, wherein said bearing means has a ring-shaped inner race which defines said clearance with said one cylindrical portion.

11. The hinge joint of claim 1, wherein said coupling element comprises a shaft which is turnable about said pivot axis and a sleeve mounted on said shaft and including said first and second eccentric cylindrical portions.

12. The hinge joint of claim 11, wherein said shaft and said sleeve include means for nonrotatably connecting the sleeve to the shaft.

13. The hinge joint of claim 1, wherein said additional cylindrical portion includes first and second parts and said first and second cylindrical portions are disposed between said first and second parts, said second cylindrical portion being adjacent and extending radially beyond one of said first and second parts, said first cylindrical portion extending radially beyond said second cylindrical portion and the other of said parts extending radially beyond said first cylindrical portion.

14. The hinge joint of claim 13, wherein said one component includes a first portion rotatably mounted on said first part of said additional cylindrical portion and a second portion rotatably mounted on the second part of said additional cylindrical portion.

15. The hinge joint of claim 1, wherein at least one of said segments is out of contact with said other cylindrical portion in each angular position of said coupling element.

16. The hinge joint of claim 1, wherein said abutment means is provided on said segments.

17. The hinge joint of claim 1, wherein said abutment means is provided on said other component.

18. The hinge joint of claim 1, further comprising means for non-rotatably connecting said segments to said other component.

19. The hinge joint of claim 1, wherein said other cylindrical portion and said other component define a substantially sickle-shaped clearance.

20. The hinge joint of claim 1, wherein the cross-sectional area of said coupling element decreases stepwise in a direction from one toward the other axial end thereof.

* * * * *